United States Patent [19]

Calvi et al.

[11] 4,118,178

[45] Oct. 3, 1978

[54] XEROGRAPHIC FUSING APPARATUS

[75] Inventors: Salvatore J. Calvi, Ridgefield; John J. Stelben, Greenwich, both of Conn.

[73] Assignee: Pitney-Bowes, Inc., Stamford, Conn.

[21] Appl. No.: 817,713

[22] Filed: Jul. 21, 1977

[51] Int. Cl.[2] .......................... H05B 3/00; G01P 3/00

[52] U.S. Cl. ........................................ 432/35; 432/59; 219/216; 355/3 FU

[58] Field of Search ...................... 432/59, 60, 228, 45, 432/35, 65; 219/216, 469; 355/3 FU; 271/272, 275

[56] References Cited

U.S. PATENT DOCUMENTS

| | | | |
|---|---|---|---|
| 3,697,722 | 10/1972 | Furnichi et al. | 432/59 |
| 3,705,289 | 12/1972 | Szostak et al. | 219/216 |
| 3,778,222 | 12/1973 | Suzuki | 432/35 |
| 3,804,516 | 4/1974 | DeMott | 432/59 |
| 3,806,314 | 4/1974 | Obuchi et al. | 432/59 |
| 3,979,161 | 9/1976 | Kremer et al. | 355/3 R |

*Primary Examiner*—John J. Camby
*Assistant Examiner*—Henry C. Yuen
*Attorney, Agent, or Firm*—Martin D. Wittstein; William D. Soltow, Jr.; Albert W. Scribner

[57] ABSTRACT

A fusing apparatus for an electrophotographic copying machine in which heat fusible developing material is deposited in image-wise configuration on a sheet of paper and fixed thereto by the application of heat. The fusing apparatus has a conveyor system for conveying the sheet of paper past a source of heat for fusing the developing material into the paper. The fusing apparatus includes a secondary driving means to maintain operation of the conveying system in the event of any failure of the normal source of driving power to the conveying system so that the conveying system does not stop with the sheet of paper still adjacent the source of heat, which would allow the sheet of paper to catch fire. The secondary driving means includes stored energy means which becomes automatically operable to maintain operation of the conveying system for a period of time sufficient to eject the copy sheet from the fusing apparatus in the event of an electrical power failure in the copying machine.

6 Claims, 3 Drawing Figures

XEROGRAPHIC FUSING APPARATUS

BACKGROUND OF THE INVENTION

1. Field of the Invention

In the field of electrophotographic copying, particularly in that area characterized as plain paper copying, a photoconductor comprising a photoconductive composition coated on a rigid or flexible substrate is uniformly electrostatically charged in the dark and then exposed by being illuminated in an image pattern in accordance with graphic material on an original document. The photoconductor becomes discharged in the areas exposed to the illumination but retains its electrostatic charge in the areas not exposed to illumination which areas correspond to the graphic material on the original document. An electrostatically attractable developing material is applied to the photoconductor, the developing material adhering to the charged areas of the photoconductor material but not to the uncharged areas, thereby resulting in a visible image of developing material which is then transferred to plain paper or other suitable substrate to become the ultimate copy. Any residual developing material remaining on the photoconductor is cleaned and the photoconductor is reused in the above manner for subsequent copies. Since the developing material is heat fusible, application of heat to the sheet of paper causes the developing material to melt and be fused into the paper so as to be permanently affixed thereto.

Since most developing materials used in plain paper electrophotographic copying are formed of thermoplastic materials which melt at fairly high temperature levels, it is typical practice to utilize a fusing device having a radiant energy source of heat which generates an extremely high temperature atmosphere in the area through which the sheet of paper passes. This extremely high temperature is necessary in view of the fact that the fusing of the developing material must take place while the sheet of paper is moving through the fuser and a given segment of developing material is exposed to the source of heat for only a brief period of time. Since the temperature of the atmosphere immediately adjacent the paper exceeds the ignition temperature of the paper, it is apparent that the paper will catch fire as a result of almost spontaneous combustion if the piece of paper should stop moving in the fuser. Potentially, this situation could be very dangerous since other parts of the copying machine could catch fire from the burning paper which is only partly enclosed with the fuser. Also, if a portion of the burning paper has already exited from the fuser, previous copies deposited in a copy paper collection tray could catch fire and possibly cause personal injury to the operator of the copying machine. Thus, it is readily apparent that a very serious problem exists with respect to utilization of this type of fuser in an electrophotographic copying machine in the event of any failure in the copying machine which results in an interruption of the movement of the copy sheet through the fuser.

2. The Prior Art

The above described problem has long been recognized, not only in the electrophotographic copying field, but even before that in the motion picture field.

U.S. Pat. No. 1,845,840 discloses a restricted passageway through which motion picture film is drawn while passing through a projector so that if the film should catch fire for any reason while passing through the projector, the fire will be choked for lack of oxygen within the confined space of the constricted area to prevent the fire from exiting from this space.

In the electrophotographic copying field, several approaches have been taken in the prior art to satisfactorily cope with the problem with fire in the fusing devices of various types of copying machines. For example, in U.S. Pat. No. 3,357,401 an air jet detector is utilized to detect the presence of a copy sheet exiting from the fusing device. In the event that the copy sheet jams in the fusing device and fails to exit therefrom, an electric circuit responsive to the combined effects of the air jet and a timer operates to energize a fire extinguishing system.

In U.S. Pat. No. 3,705,289, a bridge circuit is utilized to detect temperature in the fuser above a predetermined limit to automatically terminate the operation of the fuser while allowing a ventilator to continue to operate. The bridge circuit continously monitors the fuser to assure that the temperature remains within predetermined limits.

In U.S. Pat. No. 3,804,516, a similar type of electric bridge circuit is utilized to detect the presence of a fire in the fuser by measuring any variation in the temperature resulting from a burning sheet in order to generate an output signal to warn the operator of the existence of the fire in the machine.

In U.S. Pat. No. 3,748,088 a mechanical device is utilized to measure the velocity of the copy paper traveling through the fuser and any variation from a predetermined velocity is electronically sensed to activate appropriate controls to de-energize the source of heat in the fuser to prevent the copy sheet from catching fire.

In U.S. Pat. No. 3,778,222 a fusing apparatus includes a means for sensing the presence of fire, in response to which suitable mechanical means operate to enclose the passageway of the copy sheet through the fusing device thereby preventing spread of the fire from the fusing device.

Most recently in U.S. Pat. No. 3,979,161 a fusing apparatus in an electrophotographic copier includes a fire extinguishing snuffer device located somewhat downstream from the heat radiating portion of the fuser so that in the event of combustion of the copy sheet the flames will be extinguished by the copy sheet passing between closely spaced plates of the snuffing device.

From the variety of approaches to the problem of copy paper combustion in the fusing apparatus of electrophotographic copiers as disclosed in the foregoing patents, it is apparent that this problem has not only been long recognized but also has received considerable attention in the electrophotographic copying industry. While all of the above approaches have obvious merit, in one way or another, in solving a serious and potentially hazardous problem inherent in electrophotographic copying machines, they are, nevertheless, all directed to the particular solution of detecting the presence of a fire and either warning of, extinguishing or confining the fire as the case may be. None of the approaches described above are directed toward the problem of preventing the fire from occurring in the first instance. Although some of the above described patents disclose monitoring systems for shutting down the fusing apparatus in the event of a malfunction causing excessive heat, which may be broadly considered as an attempt to prevent the occurrence of a fire, nevertheless no provision is made in these inventions to guard against an excessive condition which may result in a fire irrespective of the deactivation of the fusing system.

SUMMARY OF THE INVENTION

The present invention relates generally to fusing apparatus for use with electrophotographic copying machines, and more particularly to such a fusing apparatus in which it is virtually impossible for a copy sheet to catch fire notwithstanding any malfunction of the fusing apparatus.

In its broader aspects, the present invention resides in a fusing apparatus for fusing xerographic developing material to a sheet of support material to permanently affix the developing material thereto, in which the fusing apparatus comprises a suitable support structure or frame, a heating means mounted on the frame and operable when energized to generate sufficient heat to cause the xerographic developing material to melt and become fused to the sheet of support material, and a conveyor means also mounted on the frame in operative association with the heating means for conveying a sheet of support material past the heating means for fusing the xerographic developing material thereto while the sheet of support material is moving past the heating means. A primary driving means is connected to the conveyor means and is normally operable to drive the conveyor means at a predetermined velocity. A secondary driving means is also connected to the conveyor means and is automatically operable to drive the conveyor means in the event of a failure of operation of the primary driving means for a period of time at least sufficient to convey the sheet of support material past the heating means in order to prevent combustion of the sheet of support material.

From the above statement, it should be appreciated, as will be more readily apparent hereinafter, that the approach of the present invention, as distinguished from the prior art cited above, is to assure that the sheet of support material is conveyed through the fuser under the normally safe operating conditions of the fusing apparatus so that the sheet of support material cannot stop in the fuser and become ignited as a result of the excessive heat in the fusing area.

In some of its more limited aspects, the present invention is embodied in a fusing apparatus in which the primary driving means for the fuser conveying means is a driving component which is connectable to the main driving means of the copying machine in which the fusing apparatus is utilized, recognizing however that the primary driving means of the fusing apparatus can be a power source mounted on the fusing apparatus itself. It is typical, however, for the fuser conveyor to be driven by the same driving means which drives the other operating instrumentalities of the copying machine.

The secondary driving means is preferably a stored energy device, again preferably mechanical, which is automatically operable to maintain operation of the conveying means in the event of a failure of the primary driving means to maintain operation of the conveying means until the sheet of support material has moved past the heating means. In the preferred embodiment disclosed, the stored energy means is a flywheel which is driven by an electric motor which also drives the conveyor means at a slow or idle speed through a one way clutch. The primary driving means also operates through a one way clutch to drive the conveyor at a higher or operating velocity while a sheet of support material is being conveyed past the heating means. In the event of a power failure, or other failure of the primary driving means, the flywheel contains sufficient kinetic energy to maintain operation of the conveying means until the sheet of support material has been moved past the heating means thereby removing the support material from the influence of the heating means to prevent combustion of the support material which would take place if the sheet of support material were to stop moving while any portion of it is still adjacent to the heating means.

Having briefly described the nature of the present invention, it is a principal object thereof to provide a fusing apparatus for an electrophotographic copying machine which effectively prevents a sheet of support material in the fuser from catching fire.

Another object of the present invention is to provide a fusing apparatus for an electrophotographic copying machine in which the sheet of support material is conveyed through the fuser and beyond the effective influence of the heating means even in the event of a failure or malfunction of the normal conveying system.

Another object of the present invention is to provide a fusing apparatus for an electrophotographic copying machine in which a conveyor for the sheet material is under the control of a secondary driving means which is automatically operable to maintain operation of the conveyor in the event of a failure or malfunction of a primary driving means for the conveyor for a period of time sufficient to move the sheet of support material beyond the source of heat.

These and other objects and advantages of the present invention will become more readily apparent from an understanding of the following detailed description of a preferred embodiment of the present invention which represents the best mode presently contemplated for carrying out the invention and when considered in conjunction with the accompanying drawings in which.

DESCRIPTION OF A PREFERRED EMBODIMENT OF THE INVENTION

Figure 1:
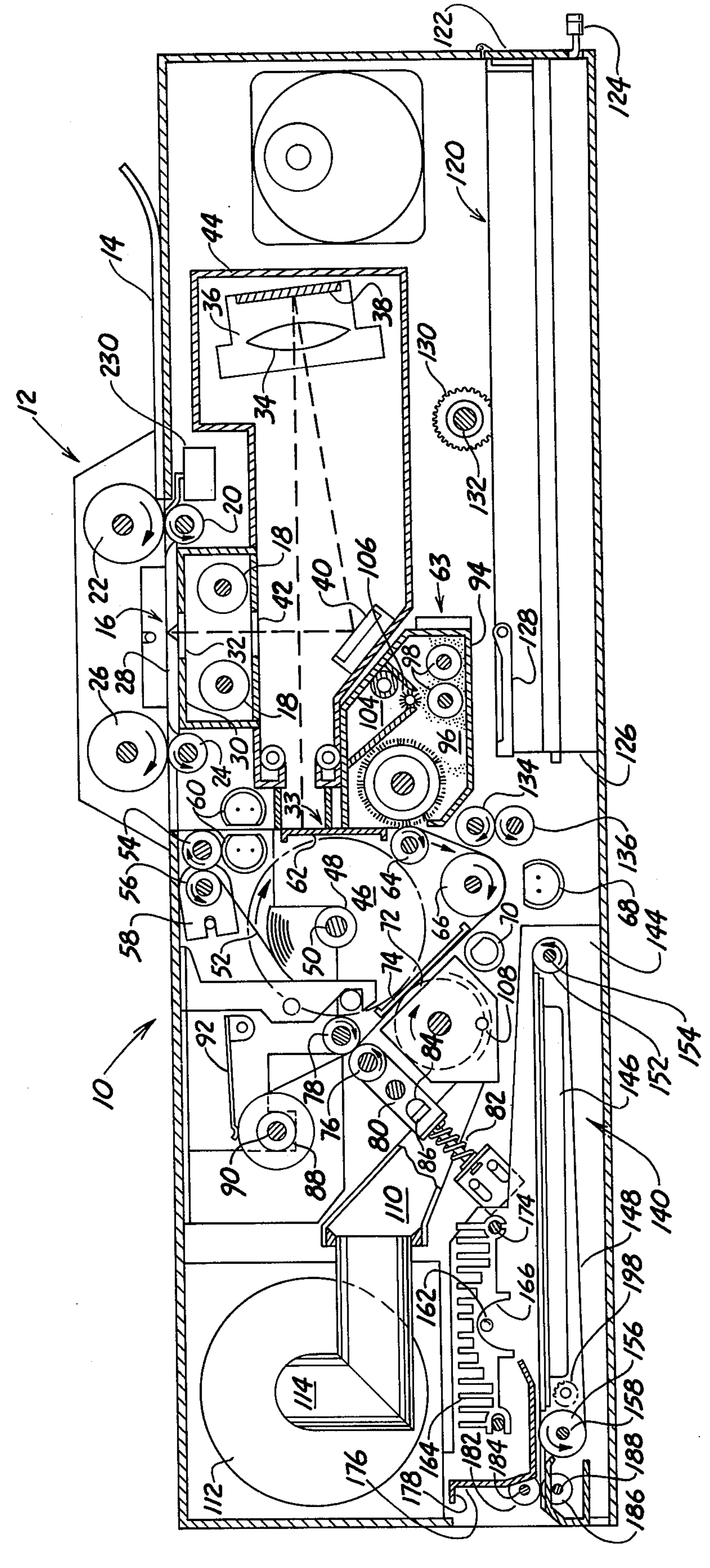
FIG. 1 is a longitudinal sectional view of an electrophotographic copying machine in which the fusing apparatus of the present invention is utilized.

Referring now to the drawings and particularly to FIG. 1 thereof, there is shown an electrophotographic copying machine in which the fusing apparatus of the present invention is utilized. The particular copying machine illustrated in the drawing is merely exemplary as far as the fusing apparatus is concerned since the fusing apparatus may be utilized with various other types of copying machines. Accordingly, only so much of the copying machine is disclosed as is necessary to an understanding of the environment in which the fusing apparatus is utilized, since further details of construction and mode of operation will be readily apparent to those skilled in the art.

In FIG. 1, the reference numeral 10 generally designates an electrophotographic copying machine which includes a suitable document feeding apparatus 12 for feeding a document 14 past an illuminating station 16 having lamps 18 to illuminate the document 14 for the purpose of making a copy thereof. The document is fed through the illuminating station by means of feed rollers 20 and 22 on the infeed end of the document handling apparatus 12 and feed rollers 24 and 26 on the outfeed end thereof, these feed rollers feeding the document 14 across the surface of a glass platen 28 at a uniform velocity. The illuminating lamps 18 are contained within a light tight box 30 having a slit 32 in the upper surface thereof through which light from the lamps 18 strikes the document as the latter moves across the glass platen 28. The box 30 prevents illumination from the lamps 18 from reaching other parts of the copying machine. The copying machine includes an optical system for projecting an image of indicia on the document 14 to an imaging station 33 at which the document image is projected onto the photoconductive surface of a photoreceptor to be described in detail hereinafter.

The optical system comprises a lens 34 which is suitably mounted in a bracket 36 adjacent one end of the copying machine 10, the bracket 36 also mounting a mirror 38 which reflects the image of the document 14 from a mirror 40 back through the lens 34 to the exposure station 32. It will be seen that a second slit 42 located in the bottom of the box 30 which encloses the illuminating lamps 18 permits the image of the document from the illuminating station 16 to reach the mirror 40, from which the image is reflected to the lens 34 and from there is reflected by the mirror 38 back through the lens 34 and thence to the exposure station 32. The optical system is also enclosed in a light tight enclosure 44 so that spurious light from the exterior of the copying machine cannot be directed to the exposure station 32.

The photoreceptor previously mentioned, onto which the image of the document is directed by the optical system, is a web of material comprising a photoconductive composition coated on a conductive substrate, such photoreceptors being well known in the art. The photoreceptor web is stored in the copying machine in the form of a roll 46 of photoconductive material which is wound upon a core 48 mounted on a rotatable shaft 50. The photoreceptor is withdrawn from the roll 46 as indicated by the web portion 52 which passes between a pair of rollers 54 and 56, the roller 56 being mounted on a pivotable bracket 58 and biased into contact with the photoreceptor portion 52 by any suitable means, the roller 56 having a certain degree of resistance to rotation in order to provide a drag on the photoreceptor so as to maintain the photoreceptor in a taut condition from the rollers 54 and 56 through its operative path of movement yet to be described.

The photoreceptor portion 52 passes over the roller 54 and thence downwardly between the shells of a charging device 60, the purpose of which is to place a uniform electrostatic charge on the photoconductive coating of the photoreceptor. The photoreceptor web then passes over a backing plate 62 as it passes by the exposure station 32. The backing plate 62 serves to support the photoreceptor web while it is being exposed to the image of the document through the optical system and also serves as a grounding plate to provide a grounding path for discharge of the electro static charge on the photoconductive surface in the areas thereof which are struck by light by the illuminating lamps 18, that is, in the non-image areas of the original document 14.

The photoreceptor web 52 then passes a developing apparatus generally designated by the reference numeral 63 which supplies electroscopic toner material to the charge pattern image remaining on the photoconductor in a manner to be described hereinafter, a roller 64 serving to guide the photoreceptor web into proximity with the developing apparatus. The photoreceptor web passes around another guide roller 66 beneath which is disposed a corona charging device 68 which causes transfer of the visible toner image from the photoreceptor to a sheet of plain paper as more fully described hereinafter. The photoreceptor web then passes a pre-cleaning lamp 70 which functions to discharge any remaining electrostatic charge on the photoreceptor web after which it comes into contact with a cleaning roller 72 which is rotating in the direction of the arrow so as to clean any remaining toner particles from the photoreceptor web, the web being supported by a backing plate 74 disposed on the side of the photoreceptor web opposite from the cleaning roller 72. Further details of the cleaning mechanism are given hereinbelow. The photoreceptor web is pulled through the previously described path of movement from the supply roll 50 by means of a pair of feed rollers 76 and 78, the roller 78 being a continuously rotating drive capstan and the roller 76 being an idler or pressure roller which is rotatably mounted on a sliding plate 80 and which causes the drive capstan to feed the photoreceptor web between the rollers 76 and 78 when the roller 76 is pressed into engagement with the roller 78.

The roller 76 is pressed into engagement with the roller 78 by means of the biasing spring 82 which continuously urges the sliding plate 80 toward a position of engagement of the rollers 76 and 78 in order to drive the photoreceptor web, the sliding plate being moved in the opposite direction by a camming shaft 84 which can be rotated in a slot 86 formed in the sliding plate 80 in order to separate the feed rollers 76 and 78. The photoreceptor web is wound up on a take-up spool 88 which is mounted on a shaft 90, the shaft 90 being suitably driven through a conventional friction clutch device in order to maintain continuous tension on the photoreceptor web being wound on the core 88. A suitable sensing means such as the feeler arm 92 can be provided as a full roll indicator which senses when the gradually increasing diameter of the roll of photoreceptor material on the spool 88 reaches a predetermined maximum, at which point appropriate circuitry connected to the feeler arm either automatically prevents further operation of the machine or energizes an indicator lamp at which time the machine operator either rewinds or replaces the photoreceptor web as desired.

Referring back to the developing apparatus 63, there is shown diagrammatically one form of magnetic brush developing apparatus of which many forms are commercially available. The apparatus comprises a housing 94 which provides a sump for containing developing material 96. The developing material 96 typically consists of a carrier component in the form of magnetically attractable iron filings and a toner component consisting of heat fusable, resinous electroscopic marking particles. The carrier component and toner component are arranged in the triboelectric series such that, upon agitation of the mixture, the toner particles are electrostatically attracted to the carrier particles, the agitation being supplied by a pair of rotatably mounted stirring devices 98 which are continuously rotating to maintain the carrier particle-toner particle mixture in a homogenous condition. A hollow cylindrical roller 100, usually having a knurled outer surface, is rotatably mounted in proximity with the portion of the photoreceptor web passing by the guide roller 64, the cylinder 100 having a stationary magnet 102 mounted therewithin. The roller 100 functions as an applicator roller to apply toner to the photoreceptor web by magnetically attracting carrier particles to the surface of the roller which carrier particles have toner particles attached thereto by electrostatic attraction. As the roller 100 rotates, the toner particles are brought into contact with the electrostatically charged portions of the photoreceptor web and are attracted from the carrier particles to the photoreceptor web since the electrostatic attraction of the charged image areas on the photoreceptor web is greater than the electrostatic attraction of the toner particles to the carrier particles on the roller 100. As the roller 100 rotates, it continuously attracts fresh carrier particles with toner particles attached thereto so as to maintain a continuous supply of toner particles to the moving photoreceptor web. In order to replace the toner particles which are deposited on the photoreceptor web, there is provided a supply container 104 of toner particles and a rotatable dispensing element 106 which periodically or continuously dispenses fresh toner particles from the container 104 through an opening in the bottom thereof to the sump 94 where the fresh toner is thoroughly mixed with the magnetic carrier particles by the stirring members 98.

The cleaning apparatus briefly referred to above comprises the cleaning roller 72 which is typically formed of a relatively soft dense bristle brush which is mounted in relation to the path of the photoreceptor web so that the bristles lightly brush across the surface of the photoreceptor web. In order to remove accumulated toner from the bristle brush, a flicker bar 108 is mounted in interferring relationship with the bristles of the rotating brush 72 so that the toner material is flicked off of the bristles as they pass the bar 108. The cleaning roller 72 and the flicker bar are enclosed in one end of a vacuum housing 110 through air is drawn by the fan 112 through a connecting duct 114. Any suitable filtering device is interposed in the vacuum housing 110 or duct 114 in order to catch and retain the toner particles which are sucked in by the fan 112, the filtering device being periodically disposable when it becomes clogged with toner particles.

The copying machine 10 is provided with any suitable means for storing copy paper in the form of individual cut sheets and for feeding the topmost sheet into operative association with other components of the copying machine in order to produce a finished copy. In the illustrated embodiment, a tray 120 holds a supply of copy paper, the tray being removable from the copying machine through a suitable opening 122 provided in the right side end wall of the copying machine as viewed in FIG. 1. The tray 120 is removed from the copying machine by pulling outwardly on the handle 124. When the tray 120 is in its normal position in the copying machine, the stack of copy paper supported by the tray is normally maintained with the forward edge of the stack of copy paper contacting the forward wall 126 of the tray 120. Any suitable corner separator means 128 is mounted on the tray 120 in order to assure that only the topmost sheet of copy paper is fed from the stack. A suitable lifting mechanism (not shown) is provided in the tray in order to urge the topmost sheet of the stack into feeding contact with an intermittently driven feed roller 130 which is mounted on a driven shaft 132, the lifting mechanism serving to maintain a uniform contact pressure between the topmost sheet and the feed roller 130 as the stack of copy paper is depleted in the course of operation of the copying machine. It will be obvious to those skilled in the art that the shaft 132 and feed roller 130 are intermittently driven in properly timed relationship with the operation of the other components of the copying machine as is well known in the art.

When a sheet of copy paper is fed from the supply tray 120, the lead edge of the sheet of paper enters the nip of a pair of continuously rotating feed rollers 134 and 136, these feed rollers serving to move the sheet of copy paper at a uniform velocity in synchronism with the movement of the photoreceptor 52. After passing by the feed rollers 134 and 136, the sheet of copy paper comes into contact with the photoconductive surface of the photoreceptor 52 at substantially the lowermost point of the guide roller 66 around which the photoreceptor web 52 passes. It is at this point that the visible toner image on the photoreceptor web 52 is transferred to the sheet of copy paper by the electrostatic attraction generated by the corona charging device 68, this technique being generally known in the art and referred to as corona backcharging.

The sheet of copy paper then passes into the fusing device generally designated by the reference numeral 140 in which device the toner material now residing on the copy paper is heated to a temperature at which the toner particles melt and are thereby fused into the copy paper so as to form a permanent copy of the original document.

Figure 2:
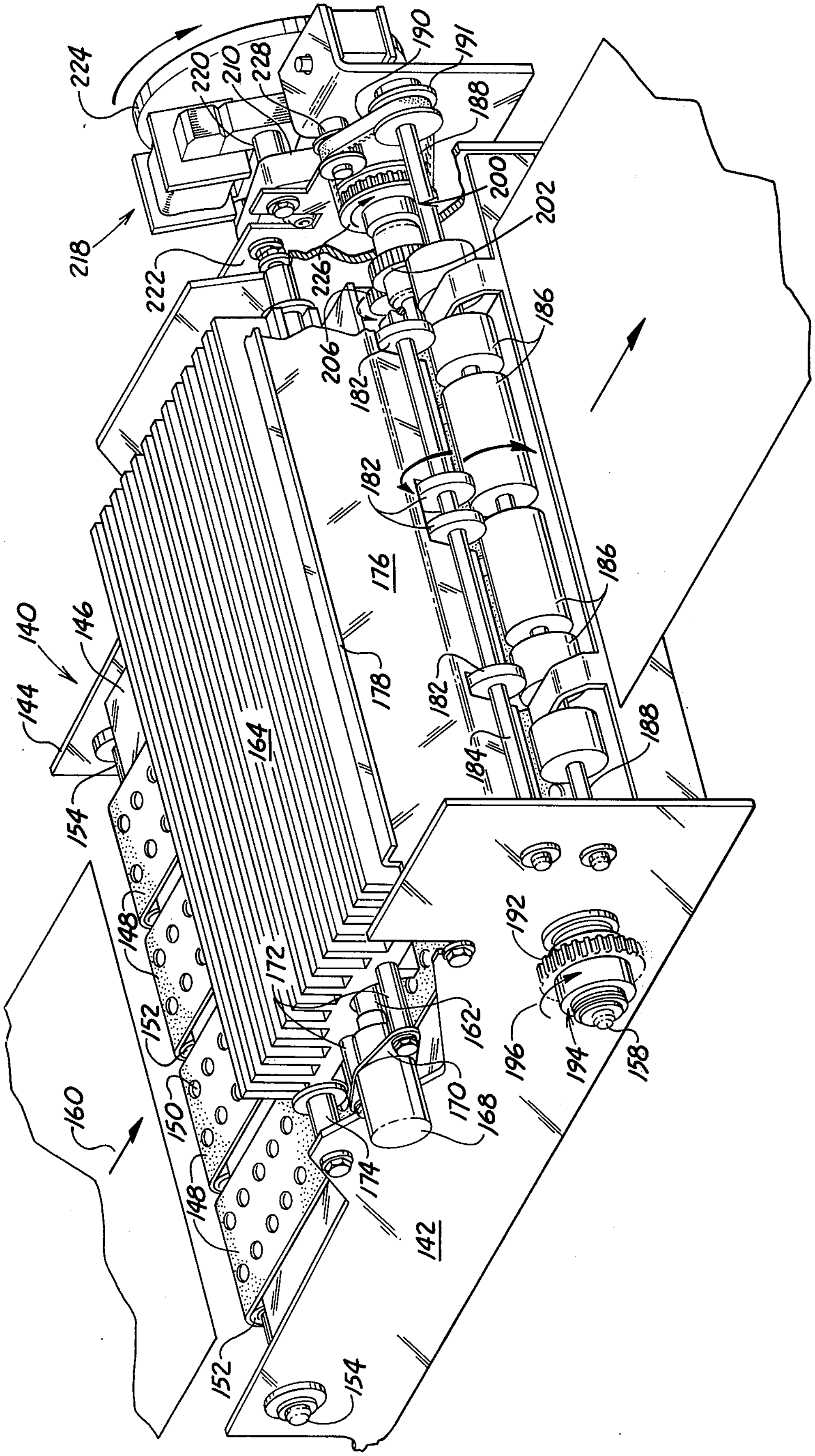
FIG. 2 is a perspective view of the fusing apparatus of the present invention.
Figure 3:
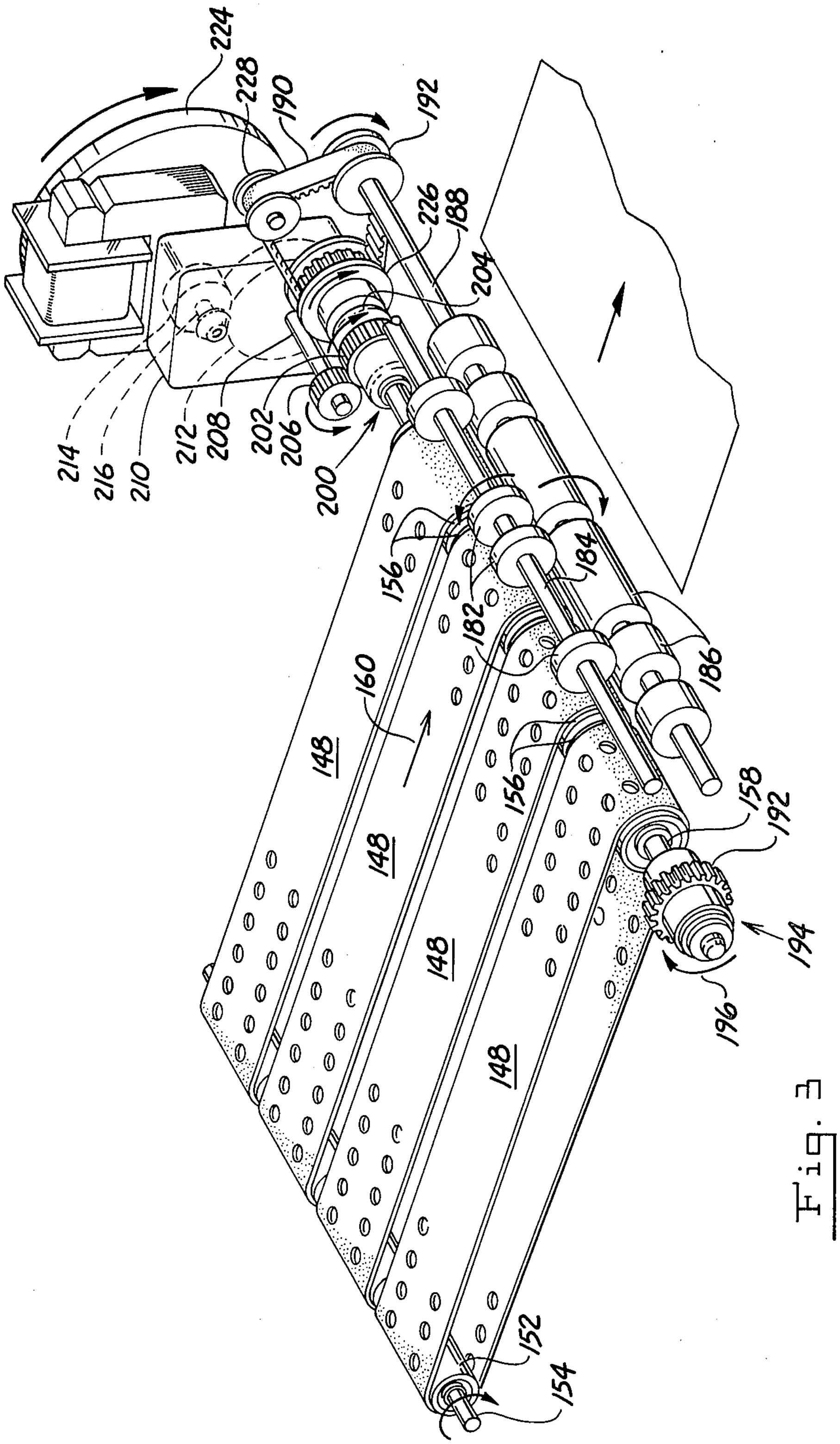
FIG. 3 is a perspective view of a portion of the fusing apparatus shown in FIG. 2.

The fusing device 140, which is the subject matter of the present invention, is illustrated in its operative position in the copying machine in FIG. 1, and is further illustrated in complete assembly but removed from the copying machine in FIG. 2 and in partial assembly in FIG. 3. Referring principally to FIG. 2, the fusing device 140 comprises a pair of side frame members 142 and 144 which support all of the components of the fusing device 140. A boxlike member 146 is mounted between the side frame members 142 and 144 and constitutes a vacuum plenum as a result of air being withdrawn from the box 146 by any suitable means and being allowed to enter the box 146 through suitable openings (not shown) in the top wall of the box 146. A plurality of conveyor belts 148 having apertures 150 therein are guided over the upper surface of the vacuum plenum 146 by a first plurality of guide rollers 152 mounted on a shaft 154 which is journaled for rotation in the side frame members 142 and 144. A second plurality of guide rollers 156 (FIG. 3) support the other end of the belts 148, the guide rollers 156 being mounted on a shaft 158 also journaled for rotation on the side frame members 142 and 144. The belts 148 are driven in the direction indicated by the arrow 160 in FIG. 2 by applying driving power to the shaft 158 in the manner to be hereinafter described.

Referring to FIG. 1, the fusing device 140 includes a high energy heating lamp 162 which is carried by a heat sink 164 and located at the focal center of a highly polished parabolic reflective surface 166 which radiates an intense amount of heat from the lamp 162 to the surface of the sheet of copy paper passing under the reflective surface 166 as the sheet of copy paper is carried by the belts 148. The heat from the reflective surface 166 is sufficiently intense to melt the toner particles resting on the copy paper as they pass within the area of influence of the reflective surface 166. As best seen in FIG. 2, the lamp 162 is mounted in a pair of electrical sockets 168 (only one of which is seen in FIG. 2), the socket 168 being mounted on a plate 170 which in turn is connected to the heat sink 164 by means of the mounting studs 172. The heat sink 164 is itself pivotally mounted to the side plates 142 and 144 by being mounted on a shaft 174 which is journaled in the side frames 142 and 144 so that the entire assembly can be raised to a vertical position after removal of the fusing device 140 from the copying machine to facilitate lamp replacement or other necessry service, or to clear a paper jam if this should occur. A forward wall 176 of the heat sink is provided with a lip 178 which functions as a convenient handle to raise the heat sink 164 to its vertical position, and a lower horizontal portion 180 of the wall 176 guides the leading edge of the sheet of copy paper toward the exit end of the fusing apparatus after the leading edge has passed beyond the end of the vacuum conveyor belts 148.

In order to ensure that the sheet of copy paper with the fused image thereon is positively withdrawn from the fusing device 140, a plurality of cooperating feed rollers are provided at the exit end of the fuser for receiving the sheet of copy paper from the vacuum conveyor belts 148. As best seen in FIGS. 2 and 3, a plurality of rollers 182 are carried on a shaft 184 which is rotatably journaled in the side plates 142 and 144, and another plurality of rollers 186 are carried by a shaft 188 also journaled in the side plates 142 and 144. The relative position of the rollers and shafts just described with respect to the forward end of the vacuum conveyor belts 148 is best seen in FIG. 1. The lower shaft 188 is driven by a timing belt 190 which passes around a pulley 191 mounted on the shaft 188, the timing belt 190 being driven in a manner yet to be described but which drives the shaft 188 and rollers 186 in synchronism with the speed of movement of the conveyor belts 148.

The belt 190, the shafts 184 and 188 with the feed rollers carried thereby, and the shaft 158 with the drive rollers 156 carried thereby and the vacuum conveyor belts 148 are all driven in synchronism with each other from two independent driving input sources, each input source having the capability of overriding the other depending upon the speed at which all of the foregoing components are driven. With particular reference to FIGS. 2 and 3, a gear 192 is mounted in driving relationship on the input side of a one way clutch assembly generally designnated by the reference numeral 194, the clutch assembly 194 being of any suitable design of which many are commercially available and which therefore need not be further described. The output end of the one way clutch assembly 194 is drivingly connected to the shaft 158 so that upon rotation of the gear 192 in a clockwise direction as indicated by the arrow 196 the gear drives the shaft 158 in a clockwise direction which in turn drives the conveyor belts 148 through the driving rollers 156. The gear 192 and associated driving elements constitute a primary driving means for driving the conveyor belts when the fusing assembly 140 is mounted in the copying machine in the operative positon as shown in FIG. 1. This is accomplished in a manner well known in the art by providing the copying machine with a gear 198 which is suitably mounted in the copying machine in a position to be engaged in driving relationship with the gear 192 when the fusing assembly 140 is operatively positioned in the copying machine as shown in FIG. 1. The gear 198 in the copying machine is driven in any suitable manner by the main driving system of the copying machine which also drives the other movable components of the copying machine described above. The gear 198 in the copy machine is driven at a predetermined uniform velocity and only when the copying machine is in operation during a copying cycle, the gear 198 being otherwise stationary, the controls of the copying machine for accomplishing this being well known in the art and which therefore need not be further described.

A second one way clutch assembly generally designated by the numeral 200 is mounted on the other end of the shaft 158 in such manner that an input driving gear 202 is connected to the input side of the clutch assembly 200, the output side of the clutch assembly 200 being drivingly connected to the shaft 158, all in a manner similar to the mounting of the one way clutch assembly 194. Thus, by driving the gear 202 in a clockwise direction as indicated by the arrow 204 the shaft 158 is also driven in a clockwise direction entirely independently of any drive input to the gear 192 of the one way clutch assembly 194. The gear 202 is driven by a gear 206 mounted on a shaft 208 which extends from a gear reduction box 210 which houses any suitable speed reducing means such as the gears 212 and 214, the gear 214 being mounted on the armature 216 of a motor generally designated by the reference numeral 218. As is best seen in FIG. 2, the gear box 210 and motor 218 constitute a unitary assembly which is connected to the fuser assembly 140 by suitable mounting studs 220 which connect the motor and gear box assembly to a plate 222 which in turn is suitably secured to the side frame plate 144 of the fusing assembly 140. A flywheel 224 is also mounted on the motor armature 216 to turn therewith, the flywheel being of a suitable mass in order to maintain operation of the motor 218 and the previously described drive chain connected thereto for a predetermined period of time for the purpose described hereafter.

Referring back to the timing belt 190, it will be seen that the belt passes around a pulley 226 which is drivingly connected to the shaft 158 to rotate therewith and to drive the belt 190. A suitable idler pulley 228 maintains proper tension in the belt 190 so that it drives the shaft 188 through the pulley 191 in synchronism with the rotation of the shaft 158, thereby driving the feed rollers 186 in synchronism with the movement of the conveyor belts 148.

In the operation of the apparatus hereinabove described, and with the fusing apparatus in its operative position as shown in FIG. 1, when the copying machine is switched on the motor 218 of the fusing apparatus is immediately energized through appropriate circuitry including the main power switch of the copying machine. The heating lamp 162 is also energized to warm the conveyor belts 148 to a predetermined temperature which is maintained by a thermostatic control operatively connected to the heating lamp 162. Energization of the motor 218 causes the gear 206 to drive the gear 202 which drives the one way clutch assembly 200 to cause the latter to rotate the shaft 158 and drive rollers 156 thereby moving the conveyor belts 148 in the direction of the arrow 160. The motor 218 is a high RPM motor, but the gears 214, 212, 206 and 202 are selected so as to effect a substantial speed reduction with the result that the belts 148 move at a relatively slow rate of speed when the belts are being driven from the motor 218 as just described. This operation of the fusing assembly is a continuous standby mode during which no fusing of developing material on a sheet of copy paper would take place. During this standby operation of the fusing apparatus, there is no drive in the copying machine to the gear 198, and therefore no drive to the gear 192 of the one way clutch assembly 194, the rotation of the shaft 158, overriding the clutch assembly 194.

When a copying cycle of operation of the copying machine is initiated, such as by feeding the document 14 past a switch 230 (FIG. 1), appropriate controls are energized to drive the several components of the copying machine and the gear 198 is now also driven to rotate at a predetermined speed. Rotation of the gear 198 in turn rotates the gear 192 on the input side of the one way clutch assembly 194. The gear ratio between the gears 198 and 192 is selected so that the gear 192 is driven by the gear 198 at a much higher RPM rate than that of the gear 202 on the input side of the one way clutch assembly 200, with the result that the belts 148 are driven at a substantially higher velocity when driven through the one way clutch assembly 194. During this mode of operation, the shaft 158 overrides the one-way clutch assembly 200 in the same manner that it overrides the clutch assembly 194 when the gear 198 is stationary; the heating lamp is energized continuously rather than intermittently and the vacuum box 146 is energized to cause a sheet of copy paper to adhere to the surface of the belts 148.

It should now be apparent that the motor 218 and associated drive elements constitute a secondary driving means which is automatically operable to drive the conveyor belts in the event of any failure of operation of the primary driving means. For example, if any mechanical failure occurs in the copying machine which interrupts the drive to the gear 198 and this gear stops running while a sheet of copy paper is passing through the fusing apparatus, the motor 218 will continue to operate at its normal rate of speed and will maintain operation of the conveyor belts 148 and the exit feed rollers 182 and 186 so as to maintain movement of the sheet of copy paper through the fusing apparatus thereby preventing the sheet of paper from igniting in the fusing apparatus.

It should also be apparent that the flywheel 224 attached to the motor armature 216 constitutes a stored energy means for motor 218 in the event of a power failure which would disable motor 218 along with the primary driving means. For example, if a power failure should occur when a copy paper is in the fuser area the flywheel will dissipate its kinetic energy through the shaft 216 thereby providing a means of driving the motor's associated drive elements which in turn will keep the conveyor belts 148 and exit feed rollers 182 and 186 moving to prevent any copy paper that may be in the fuser from igniting due to residual heat from the heating lamp 162 or reflective surface 166.

Even though we have shown the preferred embodiment of the invention as a secondary driving means that uses a flywheel as the stored energy means, it should be noted that there exists other methods of storing energy for driving the scondary driving means in case of power failure. For example, a battery and associated circuitry, similar to that used in emergency lighting systems that turn on emergency lights when there is a power failure. Then, in the event of a power failure the stored electrical energy in the battery would keep the secondary motor running so that any copy paper that may happen to be in the fuser would be transported out of danger of ignition from the residual heat of the fuser lamp.

What is claimed is:

1. For use in a copying machine having an electrically operated drive system, fusing apparatus for fusing zerographic developing material to a sheet of support material to permanently affix the developing material thereto, said fusing apparatus comprising:

A. a frame,

B. heating means mounted on said frame and operable when energized to generate sufficient heat to cause the xerographic developing material to melt and become fused to the sheet of support material, C. conveyor means mounted on said frame in operative association with said heating means for conveying a sheet of support material past said heating means for fusing the xerographic developing material thereto while the sheet of support material is moving past said heating means, D. primary driving means connected to said conveyor means and operable to drive said conveyor means at a predetermined velocity when said primary driving means is operatively associated with the drive system of the copying machine, E. secondary driving means connected to said conveyor means and being automatically operable to drive said conveyor means in the event of a failure in the electrically operated drive system of the copying machine for a period of time at least sufficient to convey the sheet of support material past said heating means to prevent combustion of the sheet of support material.

2. Fusing apparatus as set forth in claim 1 wherein said secondary driving means includes stored energy means automatically operable on said conveyor means to maintain operation of said conveyor means for said period of time.

3. Fusing apparatus as set forth in claim 2 wherein said stored energy means comprises a flywheel drivingly connected to said conveyor means and means for rotating said flywheel at a high rotational velocity during normal operation of said apparatus.

4. Fusing apparatus as set forth in claim 1 wherein said primary driving means is operable to move said conveyor means at a predetermined velocity, and said secondary driving means is operable to move said conveyor means at a decreasing velocity in the event of said failure in the electrically operated drive system of the copying machine.

5. Fusing apparatus as set forth in claim 1 wherein said primary driving means is operable to move said conveyor means at a first predetermined velocity when said primary driving means is in operation, and said secondary driving means is operable to move said conveyor means at a second predetermined velocity less than said first predetermined uniform velocity when said primary driving means is inoperable, and at a decreasing velocity in the event of said failure in the electrically operated system of the copying machine.

6. Fusing apparatus as set forth in claim 1 wherein said conveyor means comprises at least one conveyor belt supported by spaced apart rollers, and wherein said primary drivings means includes a first driving input member connected to one of said spaced apart rollers through a first one-way clutch means and said secondary driving means, includes a second driving input member connected to said one of said spaced apart rollers through a second one-way clutch means, both said one-way means being arranged to cause rotation of said one of said spaced apart rollers when said first or second driving input members are rotated in the same direction.

* * * * *